July 28, 1959  G. C. BURKHARDT ET AL  2,896,835
STACKING TRAY AND HANDLE THEREFOR
Filed Aug. 7, 1956  2 Sheets-Sheet 1
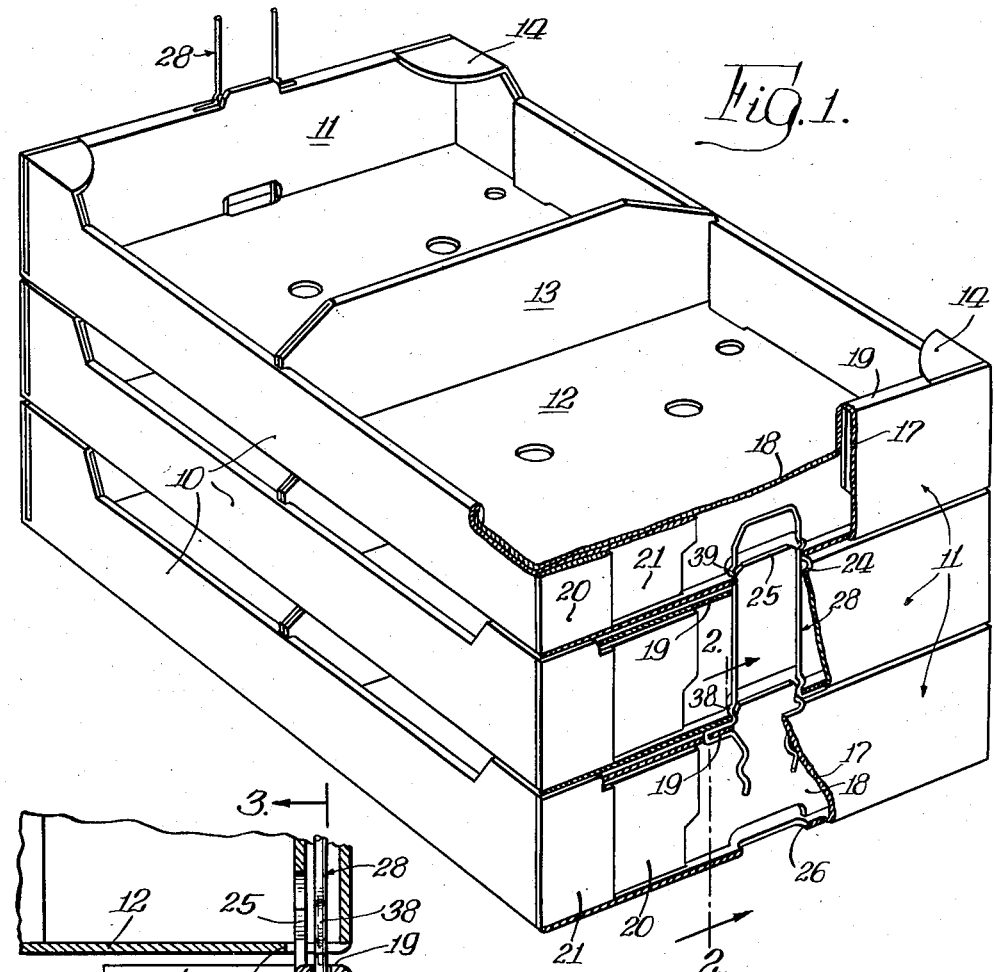
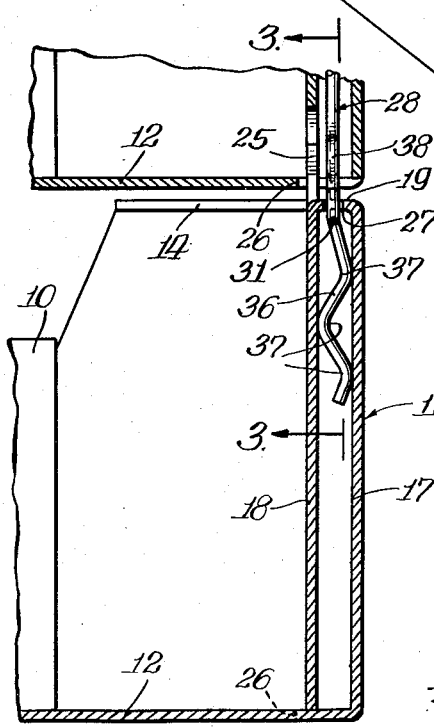
Inventors:—
George C. Burkhardt,
Clinton Eastwood,
Joseph Portola Hamilton,
By Brown, Jackson, Boettcher & Dienner
Atty's

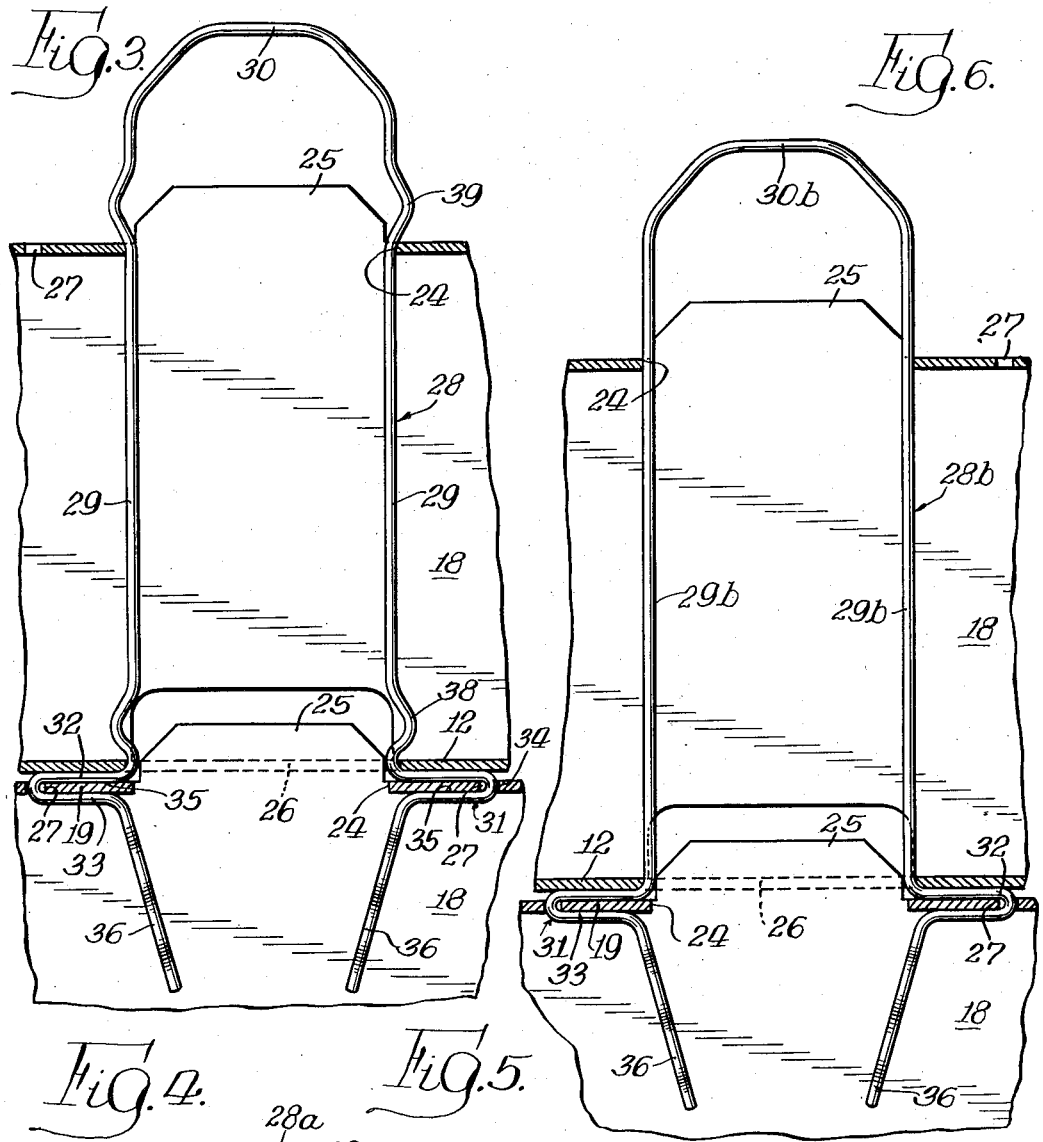

United States Patent Office 2,896,835
Patented July 28, 1959

2,896,835

STACKING TRAY AND HANDLE THEREFOR

George C. Burkhardt, South San Francisco, and Clinton Eastwood and Joseph Portola Hamilton, Oakland, Calif., assignors to Container Corporation of America, Chicago, Ill., a corporation of Delaware Application August 7, 1956, Serial No. 602,542

3 Claims. (Cl. 229—34)

This invention relates to containers, such as open top trays, which are particularly adapted to stacking and are provided with means, including handles, for maintaining the trays in proper stacked relation and for transporting the loaded trays.

Open top trays, frequently termed lugs, are used in large quantities in the harvesting of berries, fruits, vegetables and other agricultural products. In the field empty lugs or trays are arranged in stacks of considerable height, as are the loaded trays, with a view to ready availability and saving of space. The loaded trays are also arranged in stacks of considerable height in storage. It is desirable that the stacked trays, particularly when loaded, be maintained in vertical alignment so as to guard against tipping over of individual trays or of the entire stack, with resultant spillage of and injury to the contents thereof. It is also desirable that the loaded trays be removed from the stack with expedition and facility for shipment or for restacking in storage. Our invention is directed to trays or lugs having means whereby the above objects are effected at comparatively low cost, an important practical consideration in this highly competitive field. To that end we provide the trays with cooperating means such that empty trays may readily be stacked and when stacked are held in proper alignment while being readily removable from the stack. We also provide handles which may be quickly applied to the trays for carrying them when loaded, the handles serving to tie together the loaded trays of a stack so as to guard against overturning thereof and providing means for carrying two of the loaded trays with the weight thereof so distributed that handles of comparatively light wire may be used. That is of importance in respect to saving in the cost of production, in view of the fact that some millions of containers of the character with which our invention is concerned are used annually. Further objects and advantages of our invention will appear from the detail description.

In the drawings:

Figure 1 is a perspective view of several stacked trays with handles, embodying my invention, the trays being partly broken away and shown in section.

Figure 2 is a sectional view, on an enlarged scale taken substantially on line 2—2 of Figure 1;

Figure 3 is a sectional view, on an enlarged scale, taken substantially on line 3—3 of Figure 2;

Figure 4 is a view similar to Figure 2 but showing a modified form of handle;

Figure 5 is a view similar to Figure 4 but showing a second modified form of handle; and Figure 6 is a view similar to Figure 3 but showing the modified form of handle of Figure 5.

Within the broader aspects of our invention, the tray may be of any suitable construction. The tray shown, by way of example, is similar to that disclosed in the copending application of Joseph Portola Hamilton, for Stacking Paperboard Tray, Serial No. 602,600, filed August 7, 1956, now Patent No. 2,868,430. It is formed of paperboard, preferably double faced corrugated paperboard, is rectangular in plan, and has side and end walls 10 and 11, respectively, attached to and extending upward from a bottom wall panel 12, and a central transverse partition 13. The end portions of the side walls 10 are of the same height as the end walls 11 and are joined thereto by substantially triangular seats 14, and the remaining portions of the side walls 10 are of materially less height than the end walls 11.

Each of the end walls 11 comprises an outer panel 17 integrally attached at its lower edge to the bottom wall panel 12 and an inner panel 18 parallel with the outer panel 17 and extending downward to the bottom wall panel 12, the upper edges of the panels 17 and 18 being connected by a relatively narrow fold strip 19 integrally attached to the upper edges thereof and spanning the space therebetween. The panels 17 and 18 are spaced apart by flaps 20 and 21 extending inwardly therebetween from the sides of the tray body and panel 18 is held in parallel relation to panel 17 in a suitable manner, preferably in the same manner as in the tray of the above identified copending application. The fold strip 19 provides a seating surface supplementary to the corner seats 14.

The fold strip 19 of each end wall 11 is provided centrally thereof with a lengthwise slot 24 providing a corresponding tab 25 extending upward from the upper edge of the inner end wall panel 18. The bottom wall panel 12 is provided centrally of each end thereof with a transverse slot 26, the outer edge of which is defined by the lower edge of the outer end wall panel 17, which is aligned with slot 24 in fold strip 19 and is of approximately the same length as slot 24. In stacking the empty trays, the tabs 25 of a lower tray may be flexed outward slightly so as to pass through the bottom slots 26 of an upper tray and entered between the end wall panels 17 and 18 of the upper tray as it is positioned upon the lower tray. In that manner the tabs 25 center the stacked trays and tie them together so as to guard against displacement of individual trays or overturning of the stack due to misalignment of the stacked trays, while permitting ready removal of empty trays from the stack as required. That will be clear from Figure 1 showing several stacked trays with the tab 25 of the bottom tray passing through the bottom slot 26 and between the end wall panels 17 and 18 of the second tray, and the tab 25 of the second tray passing through the bottom slot 26 and between the end wall panels 17 and 18 of the third tray.

When the empty trays are removed from the stack thereof to be loaded they are provided with end handles, either preliminary to loading of the tray or after loading thereof. To that end the fold strip 19 at each end of the tray is provided with openings 27 spaced an appreciable distance away from the ends of the slot 24. The openings 27 receive elements, to be referred to more fully presently, of a handle 28 shown more clearly in Figures 2 and 3. The handle 28 is formed of material possessing considerable spring or resiliency and of adequate mechanical strength, preferably spring wire of suitable gauge. It is of approximately elongated inverted U shape and comprised downwardly extending arms 29 connected at their upper ends by a bight portion 30, the arms 29 being urged away from each other by the inherent resiliency of the handle and diverging downwardly when the handle is not compressed laterally. Each arm 29 is provided, at the lower end thereof, with a loop 31 comprising upper and lower fingers 32 and 33 disposed in substantially horizontally parallel relation and connected together at their outer ends by a bight element 34. The loops 31 project outwardly from the arms 29 in the plane of handle 28 and define two opposed slots 35 opening inwardly of the handle. The lower finger 33 of each of the loops 31 is provided with a downward extension or member 36 which is bent in alternately opposite directions perpendicular to finger 33 to provide bends or offsets 37 the crests of which are so spaced as to have pressure contact with the inner faces of the end wall panels 17 and 18 when the handle is mounted on the end wall 11 in a manner to be described. Each arm 29 of handle 28 is further provided with a lower outwardly extending bend or offset 38, spaced a short distance above the upper finger 32 of loop 31, and with an upper outwardly extending offset or bend 39, the offsets 38 and 39 being disposed in the same vertical plane as finger 32.

In applying the handle 28 to the tray, the arms 29 of the handle are pressed toward each other and the extensions 36 are inserted downward through the openings 27 which are of greater area than the cross sectional area of the bight elements 34 of loops 31, preferably approximately twice the cross sectional area of bight elements 34. In the insertion of extensions 36 the lower fingers 33 of loops 31 contact the upper face of fold strip 19, after which the arms 29 of handle 28 are forced toward each other to a further extent thereby inserting fingers 33 of loops 31 through the openings 27. The arms 29 of handle 28 are then released and the handle expands slightly, due to its inherent resiliency, until the bight elements 34 of loops 31 contact the fold strip 19 at the outer sides of the openings 27. With the handle thus mounted on the end wall of the tray, the extensions or members 36 fit tightly between the panels 17 and 18 effective for holding handle 28 in upright position and the portions of fold strip 19 between the ends of slot 24 therein and the openings 27 extend into the slots 35 of loops 31, as will be clear from Figures 2 and 3. The upper fingers 32 of the loops 31 are then disposed at the upper face of fold strip 19 and the lower fingers 33 are disposed at the underface of strip 19. In practice, the bottom tray of the stack is provided with handles and thereafter alternate trays of the stack are provided with handles. In stacking the loaded trays the handles of a lower tray extend upward through the end walls of the next superjacent tray and through slots 24 in the fold strips 19 of the latter tray, projecting above that tray approximately one-half the height of the end wall thereof, the handles being of a height equal to approximately one and one-half times the height of the tray end wall. By grasping the bight portions 30 of the handles 28 two trays may be removed as a unit from the stack without disturbing the lower trays thereof, for transport to storage or to the packing plant. The units of two trays may readily be stacked in the manner previously described, the handles serving as guide and centering means for the trays during stacking thereof. As will be understood, the handles hold the trays of a stack against relative movement and retain them in proper vertical alignment. When the trays are stacked, the outwardly extending projections 38 of the arms 29 of handle 28 engage over the bottom wall panel of the upper tray seated upon a lower tray provided with handles, and the upper projections 39 of arms 29 of the handle engage over the fold strip 19 of the end wall of such upper tray. In that connection, the slots 26 in the bottom wall panel 12 and the slots 24 in the fold strips 19 are of such length that the arms 29 of the handles 28 are flexed inwardly to some extent, as permitted by the openings 27 in fold strips 19, so that arms 29 of the handle 28 are maintained in pressure contact with the bottom wall panel 12 at the ends of the slots 26 and with the fold strips 19 at the ends of the slots 24 of the upper tray seating on a lower tray provided with the handles 28. That is desirable in preventing any objectionable vertical looseness or play between the trays of each unit of two trays, particularly when carrying the unit. By having the lower fingers 33 of the loops 31 of handle 28 disposed at the under faces of the fold strips 19 and the fingers 32 at the upper faces thereof, the fingers 33 carry the load of the lower tray of a unit of two trays and the fingers 32 carry the load of the upper tray. In that manner the weight of the two trays is divided between the two fingers of the loops and the wire from which the handle is formed may be of considerably lighter gauge than would be the case if the weight of the two trays were supported by but a single finger or projection on each arm of the handle. That effects a saving in cost of production of the handles which, though not substantial per handle is substantial and of practical importance in the quantity production of handles, of which many millions may be used per year.

In the modified form of handle 28a shown in Figure 4 the arms 29a are provided with loops 32a and with downward extensions or members 36a having oppositely disposed bends 37a the crests of which are flattened so as to seat flatwise against the inner faces of the end wall panels 17 and 18 of the tray. The handle of Figure 4 is otherwise the same as that of Figures 1 to 3, inclusive, and need not be described in further detail.

The modified form of handle 28b shown in Figures 5 and 6 is similar to the handle shown in Figures 1 to 3, inclusive, but omits certain features of the latter handle. Handle 28b comprises downwardly extending arms 29b connected at their upper ends by a bight portion 30b and provided at their lower ends with loops 31 the lower fingers 33 of which are provided with downward extensions or members 36 formed and functioning in the same manner as the extensions or members 36 of handle 28 of Figures 1 to 3, inclusive. The handle of Figures 5 and 6 functions in the same manner as the handle of Figures 1 to 3, inclusive, except for the omission of the projections 38 and 39 of the latter handle, and need not be described in further detail. It will be noted that in the several forms of handles illustrated, the arms thereof are provided with loops defining opposed slots opening inwardly of the handle for receiving portions of the fold strips of the end walls of the tray as and for the purposes above stated, which is an important feature of our invention.

As above indicated, and as will be understood, changes in detail may be resorted to without departing from the field and scope of our invention, and we intend to include all such variations, as fall within the scope of the appended claims, in this application in which the preferred forms only of our invention have been disclosed.

We claim:

1. In a stacking tray, a body substantially rectangular in plan and having a bottom wall panel and side and end walls secured to and extending upward from said panel, said end walls respectively comprising a plurality of panels including spaced apart inner and outer panels and a fold strip bridging the space between and integrally secured to the upper edges of said inner and outer panels, said fold strips respectively having a lengthwise slot therein and said bottom wall panel having slots aligned with said fold strip slots, and a handle of substantially elongated inverted U-shape at each end of said body having adjacent the lower end of each of its arms a loop disposed substantially perpendicular thereto and in the plane of said handle and comprising an upper finger and a lower finger, said loops receiving the portions of said fold strip adjacent the ends of said slot therein with said upper fingers at the upper faces of said portions and said lower fingers at the lower faces of said portions effective for restraining said handle against vertical movement in either direction relative to said end wall said handle having members extending from said lower fingers downward between said inner and outer end wall panels, said members being provided with vertically spaced bends extending in alternatively opposite directions substantially perpendicular to and bridging the space between said inner and outer panels, said bends being in pressure contact with the inner faces of said inner and outer panels and in cooperation therewith holding said handle in substantially vertical alignment with said end wall.

2. In a stacking tray, a body substantially rectangular in plan and having a bottom wall panel and side and end walls secured to and extending upward from said panel, said end walls respectively comprising inner and outer panels spaced apart and a fold strip bridging the space between and secured to the upper edges of said panels, said fold strips respectively having therein a lengthwise slot and openings spaced a material distance from the ends of said slot and said bottom wall panel having slots aligned with said fold strip slots, and a resilient handle at each end of said body, said handle being of substantially elongated inverted U-shape comprising two arms each provided at its lower end with a loop formed by two fingers extending outwardly from said arm substantially perpendicular thereto in the plane of said handle and connected at their outer ends by a bight element, said loops defining opposed slots opening inwardly of said handle and of a height approximating the thickness of said fold strip, the bight elements of said loops being inserted through said openings and the portions of said fold strip between the ends of the slot therein and said openings extending into the slots of said loops with the upper fingers of the loops at the upper face of said fold strip and the lower fingers of said loops at the under face of said fold strip, effective for restraining said handle against vertical movement in either direction relative to said wall structure, said handles respectively having members extending from the inner ends of said lower fingers downward beyond said loops and between said inner and outer end wall panels, said members being provided with vertically spaced bends extending in alternately opposite directions substantially perpendicular to and bridging the space between said inner and outer panels, said bends being in pressure contact with the inner faces of said inner and outer panels and in cooperation therewith holding said handles in substantially vertical alignment with said end walls, said handles respectively being of a height greater than said end walls and said bottom panel and fold strip slots being of a length approximating the width of said handle for reception of a similar handle of a similar subjacent tray body and effective for restraining the arms of such similar handle against objectionable separation.

3. In a stacking tray, a body having a bottom wall panel and a wall structure secured to and extending upward from said panel and comprising inner and outer panels spaced apart and a fold strip bridging the space between and secured to the upper edges of said inner and outer panels, and a handle of approximately elongated inverted U shape provided at the lower end of each arm with a loop substantially perpendicular to said arm, said loops respectively comprising two substantially parallel fingers connected by a bight element and being disposed substantially in the plane of said handle with their open ends oppositely directed, the bight elements of said loops being inserted through said fold strip and adjacent portions of the latter extending into said loops with said fingers disposed at the upper and the lower faces of said strip effective for restraining said handle against vertical movement in either direction relative to said wall structure, said handle having members extending from the open ends of said loops downward between said wall structure inner and outer panels and provided with vertically spaced elements extending in alternately opposite directions substantially perpendicular to said inner and outer panels, said elements bridging the space between said inner and outer panels and contacting the inner faces thereof and in cooperation therewith holding said handle in substantially vertical alignment with said wall structure.

References Cited in the file of this patent

UNITED STATES PATENTS

| | | |
|---|---|---|
| 1,225,705 | Dyson | May 8, 1917 |
| 2,158,661 | Kahrer | May 16, 1939 |
| 2,161,639 | Schmidt | June 6, 1939 |
| 2,232,632 | Reynolds | Feb. 18, 1941 |
| 2,397,880 | Newman | Apr. 2, 1946 |
| 2,594,628 | Evans | Apr. 29, 1952 |
| 2,654,475 | Carpenter | Oct. 6, 1953 |
| 2,777,627 | Crane | Jan. 15, 1957 |

FOREIGN PATENTS

| | | |
|---|---|---|
| 18,014 | Great Britain | of 1909 |